Dec. 30, 1952 H. T. OLSON 2,623,436
REFLECTOR MOUNTING MEANS
Filed Oct. 4, 1949 2 SHEETS—SHEET 1
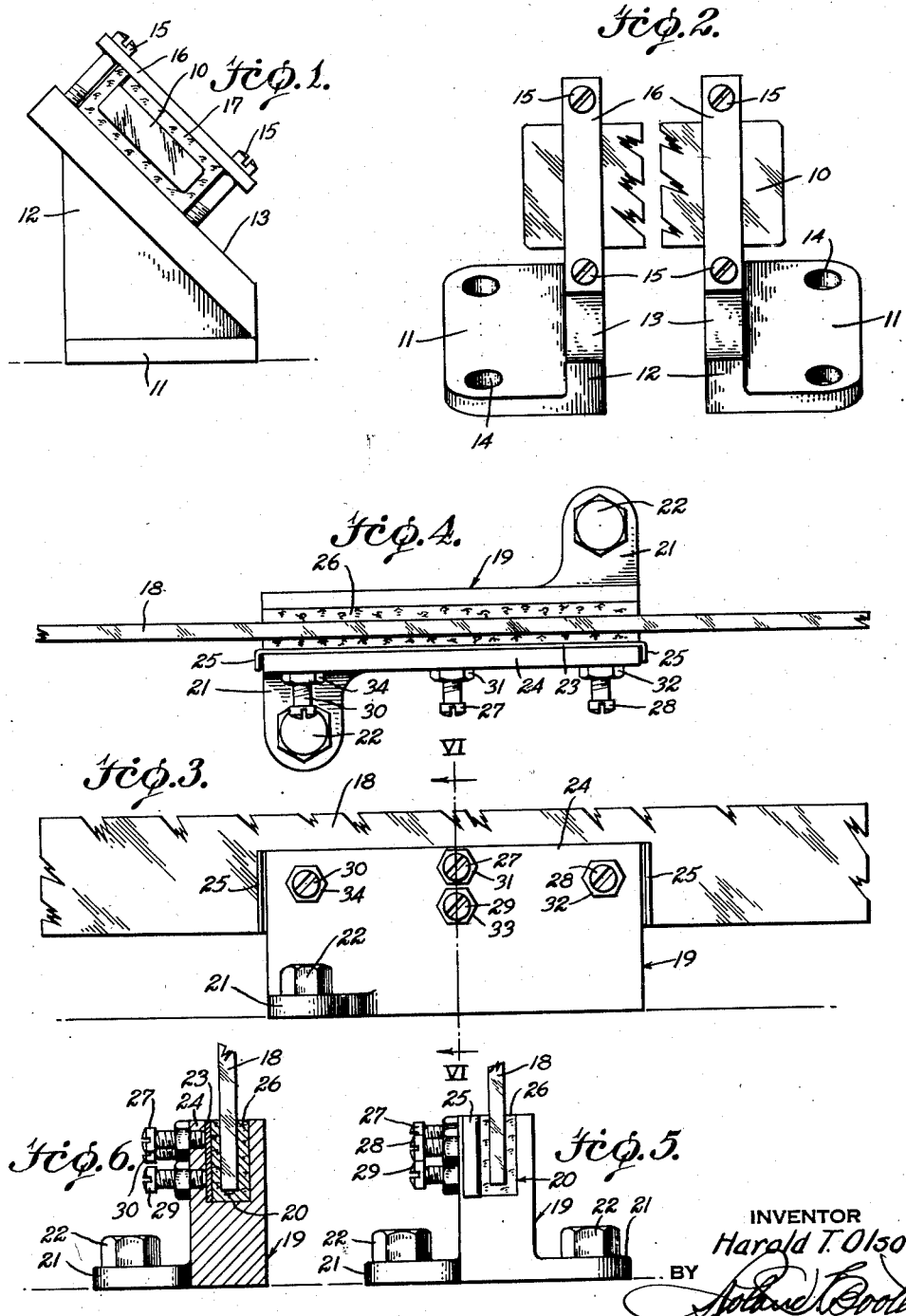
INVENTOR
Harold T. Olson
BY
ATTORNEY Dec. 30, 1952 — H. T. OLSON — 2,623,436
REFLECTOR MOUNTING MEANS
Filed Oct. 4, 1949 — 2 SHEETS—SHEET 2
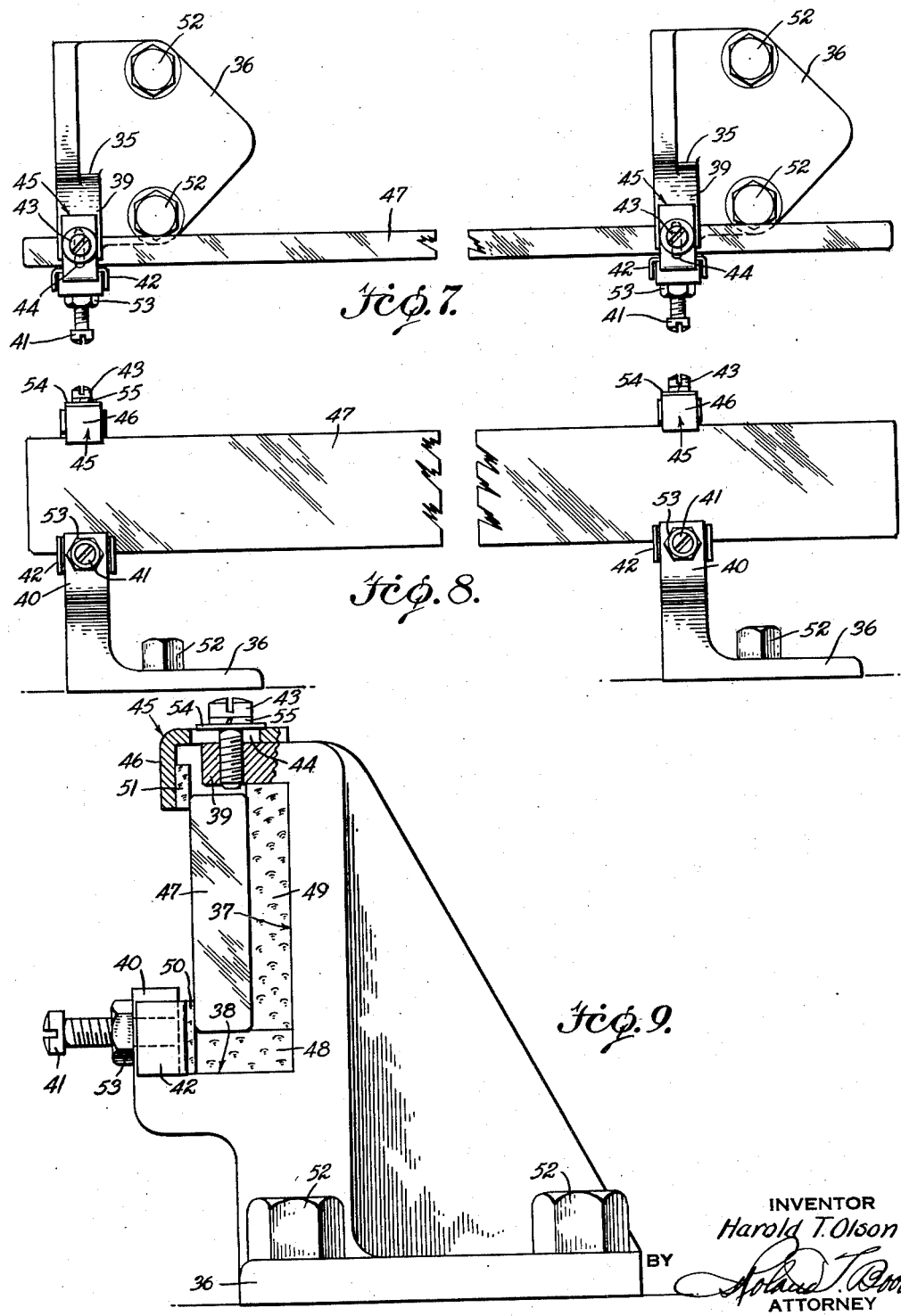
INVENTOR
Harold T. Olson
BY
Roland J. Booth
ATTORNEY Patented Dec. 30, 1952

2,623,436

UNITED STATES PATENT OFFICE 2,623,436

REFLECTOR MOUNTING MEANS

Harold T. Olson, Baldwin, N. Y., assignor to Remington Rand Inc., New York, N. Y., a corporation of Delaware Application October 4, 1949, Serial No. 119,528

9 Claims. (Cl. 88—97)

This invention relates to means for mounting a reflector in relation to a fixed base or support in a manner which permits the plane of the reflecting surface to be very accurately adjusted and which also provides for secure support and insulation against shock and vibration.

The accompanying drawings illustrate an embodiment of the invention which provides a mounting for the various reflectors in the document photographing machine described in the application of William W. Eaton and Harold T. Olson, Serial No. 119,525, filed concurrently herewith, in which apparatus a very critical final adjustment of the reflectors is required. It will, however, be appreciated that there are no doubt many similar embodiments in optical apparatus generally where the present invention is useful.

In the drawings:

Fig. 1 is a side elevation of a form of mounting by means of which a mirror is secured in two brackets, one at each end.

Fig. 2 is an oblique auxiliary view of the mounting shown in Fig. 1 with the mirror shown broken away between the brackets.

Figs. 3, 4 and 5 are respectively a front elevation, a plan and an elevation showing a modified form of mounting securing a mirror for limited universal adjustment and engaging the mirror substantially centrally of its lower edge. In those views also the mirror has been shown broken away around the central portion of the lower edge which is engaged by the mounting.

Fig. 6 is a section on the line VI—VI of Fig. 3.

Figs. 7, 8 and 9 are respectively a plan view, a front elevation and a side elevation showing an alternative method of mounting a mirror by end brackets, one at each end. In Figs. 7 and 8 the mirror is shown broken away between the bracket and in Fig. 9 the upper part of the mounting has been shown partially broken away the better to reveal the constructional details thereof.

Referring now to the construction shown with reference to Figs. 1 and 2, the mirror is indicated by the reference numeral 10 and in this case is required to be secured with its reflecting surface at an angle of approximately 45 degrees to the horizontal. Brackets are therefore provided one near each end of the mirror. Each bracket comprises a base portion 11, having an upright portion 12 which defines a flat, but appropriately inclined supporting face 13. The base is provided with bolt holes 14 through which bolts are engaged for anchoring the brackets to the bed of the apparatus, and appropriately spaced adjustment bolts 15 pass through the pressure plate 16 into threaded engagement with appropriately spaced holes in the supporting face 13. Each of the pressure plates 16 thus provides in conjunction with the supporting face 13, an adjustable clamp; and a strip of cork indicated by the reference numeral 17 is wrapped about that part of the mirror which is engaged by the clamp. In assembly it is usually found convenient to leave one of the bolts 15 of each bracket engaged and after swinging the plate round about the engaged bolt, the wrapped portion of the mirror can be appropriately placed on the supporting face 13, whereafter the pressure plate can be swung back into position and engaged as seen in Fig. 1 by insertion of the second bolt 15. Having located one end of the mirror, the same procedure is repeated with the bracket at the other end.

In the document photographing apparatus for which the mirror mountings according to the present invention were designed, the mirror receives an incident image projected a distance of several feet and reflects it onto another mirror, or into the photographing field of the camera also several feet away and a very precise adjustment of the mirror is therefore essential. It will be appreciated that if, for example, the upper bolt 15 on one bracket is tightened, the enlarged head of that bolt moves the upper end of the pressure plate 16 towards the supporting face 13 thus compressing and locally distorting the upper part of the cork layer 17. Since the compression of the cork is localized at the top of the clamp, the upper part of the mirror is moved towards the supporting face, the effect being substantially as though the mirror is tilted about its lower edge anticlockwise as viewed in Fig. 1. If, instead of tightening the upper one of the adjustment bolts 15, pressure is applied to the cork layer 17 by tightening the lower screw 15, the lower part of the cork layer is compressed and it is as though the mirror were tilted about its upper edge clockwise as viewed in Fig. 1. Similarly, if the clamp at one end is tightened relatively to the clamp at the other end of the mirror, the effect obtained is that the mirror is swung rearwardly toward the supporting face at the end at which the adjustment is made and virtually swings about its other end.

In the alternative construction shown with reference to Figs. 3 to 6 inclusive, a single mounting is provided for engagement with a central portion at the lower edge of the mirror 18 which it can be assumed is required to present its reflecting surface substantially vertically. In that form the bracket is mainly constituted by a block 19 presenting an upwardly directed channel 20, see Figs. 5 and 6, and includes the apertured lugs 21 through which the bolts 22 engage for securing the bracket on the bed of the apparatus on which the mirror is to be used. A pressure plate 23 is engaged in the channel adjacent one end wall 24 thereof, and the pressure plate has its ends turned back as indicated at 25 to engage the ends of the wall 25 for location of the pressure plate against resistive endwise movement. The edge of the mirror 18 is engaged in the cork insert 26 in the channel and is securely located by tightening up the adjustment bolts 27, 28, 29 and 30 until their respective ends engage with the pressure plate 23. For achieving the accurate final adjustment of the plane of the mirror, the adjustment bolts are manipulated individually. Thus, if the bolt 27 be tightened, the upper edge of the pressure plate 23 is forced inwardly and the corresponding tilting of the pressure plate effects local compression of the upper part of the cork in insert 26, with the result that the upper edge of the mirror is also forced backwardly as though it were in effect tilted back about its lower edge. Corresponding application of pressure through the bottom of the pressure plate by means of the bolt 29 will result in local compression of the lower part of the cork insert 26, thereby tending to tilt the upper edge of the mirror forwardly as viewed in Fig. 3. Adjustment of the mirror in azimuth can be similarly performed by appropriate manipulation of the bolts 28 or 30, as the case may be, according to the sense in which the adjustment is required. When the final adjustment has been achieved the bolts can be locked in position by tightening their respective lock nuts 31, 32, 33 and 34.

The construction shown with reference to Figs. 7, 8 and 9, like that of Figs. 1 and 2, employs a pair of brackets engaging the mirror at points near each end and provides for a similar degree of universal adjustment. It will be seen however, that in the construction of Figs. 7, 8 and 9 the clamps are designed to obscure less of the reflecting surface of the mirror. In this case, the upright part 35 upstanding from the foot part 36 of the bracket has its forwardly directed face recessed to provide a substantially vertical supporting face 37 terminating at its lower end with the upwardly directed channel 38, and at the top in the forwardly projecting lip portion 39. The front of the channel is constituted by the wall 40 through which the adjustment bolt 41 projects for engagement with the pressure plate 42, the ends of which are bent around the ends of the wall 40 for location of the pressure plate against movement longitudinally with respect to the wall 40. At the top of each bracket an adjustment screw 43 extends through an elongated slot 44 provided in the adjustable clamping member 45. The clamping member 45 has a downwardly projecting portion 46, which is long enough to project below the upper edge of the mirror 47 when it is installed. The strip of cork 48 is interposed between the mirror 47 and the base of the channel 38 and another strip 49 is interposed between the back of the mirror and the back supporting face 37. At the front of the mirror the cork strip 50 is interposed between the pressure plate 42 and the cooperating lower edge portion at the front of the mirror, and a similar strip 51 is provided between the depending clamp portion 46 and the cooperating upper edge of the mirror.

As with the constructions previously described, the base part 36 of each bracket is apertured for engagement of the bolts 52 by means of which the bracket is anchored. A lock nut 53 is also provided on the adjustment bolt 41 and the washer 54, and a spring lock washer 55 are preferably interposed between the head of the adjustment bolt 43 and the slotted horizontal portion of the clamping member 45. For installation of the mirror 47, the adjustment bolt 41 is slackened off to permit retraction of the pressure plate 42 to about its fullest extent and at the upper end of the bracket, the adjustment bolt 43 can be slackened off or completely removed to release the clamping member 45. The mirror is then placed in position on the cork layers with its lower edge engaged in the channel 38 and the cork strip 50 is inserted between the face of the pressure plate and the mirror, whereafter the adjustment bolt 41 is then tightened to bring the pressure plate into gripping engagement with the lower edge of the mirror. The clamping member 45 is then adjusted into position with the cork strip 51 interposed between its inner surface at the upper edge of the mirror and finally locked by tightening the adjustment screw 43. The final precise adjustment which the construction shown with reference to Figs. 7, 8 and 9 provides for, is very similar in nature to that of the Figs. 1 and 2 construction. Thus, if with the mirror installed it is found that it is necessary virtually to tilt it about its upper edge anticlockwise as viewed in Fig. 9, the pressure plate 42 is actuated by tightening the bolt 41 to apply pressure to the lower part of the cork layer 49 thereby moving the lower edge of the mirror 47 inwardly toward the rear supporting face 37. On the other hand, if the locking screw 43 is slackened off and the clamping member is moved inwardly the lower edge of the mirror will remain substantially unaffected and the upper edge will be forced backwardly toward the rear supporting face 37 with corresponding compression of the cork, the adjustment is finally preserved by locking the adjustment screw 43. As with the construction described with reference to Figs. 1 and 2, general tightening of the pressure plate and clamping member of one bracket in relation to those of the other will affect adjustment of the mirror in azimuth.

All the constructions provide for limited degree of what for all practical purposes is universal adjustment within fine limits in a very simple manner, and moreover the interposition of the cork between the clamp and the cooperating part of the mirror provides for insulation of the mirror against shock and vibration. At installation the brackets are mounted as accurately as is reasonably possible and an incident image is finally sighted right through to the final objective, adjustments being made at the various mirror stages until the image is correctly centered in the mirror at the final stage.

Each of the constructions has its field of usefulness and all provide a very secure mounting which, when once adjusted, remains so. Thus the construction described with reference to Figs. 1 and 2 has merit of simplicity for use where only the part of the mirror between the pressure plates is used. The construction of Figs. 3 to 6 is useful where a single bracket is preferable to the employment of two brackets, one at each end, and where the obscuration of the narrow portion of the reflecting surface at the bottom of the mirror is of no consequence. Likewise, the construction shown with reference to Figs. 7, 8 and 9, obscures only a very small portion at the edges of the reflecting surface but leaves the center portion unobstructed throughout the full length of the mirror.

It will be appreciated that there are many other compressible and resilient materials which could be used in place of the cork, cork however provides a very satisfactory medium because it has no marked tendency to rapid deterioration with age, it is not subject to corrosion either of itself or of the associated parts; moreover, it is not unduly expensive, and is easy to use for the intended purposes in accordance with the present invention.

The invention claimed is:

1. In combination a reflector and mounting means therefor comprising a pair of brackets, one at each end of said reflector for mounting it on a supporting structure, each bracket including a base portion for connection to the supporting structure, a reflector supporting face remote from base portion, a pressure plate, adjusting and securing bolts passing through and engaging said pressure plate and said bracket to locate said pressure plate in position spanning a reflector end portion engaged on said reflector supporting surface, and compressible means engaged between said reflector and said reflector supporting face and between said reflector and said pressure plate subject to deformation by said pressure plate for adjusting the plane of the reflector.

2. In combination a reflector and mounting means therefor comprising a protective layer of compressible material disposed against opposite surface sections near each end of said reflector, and a pair of brackets, one at each end of said reflector, engaging one surface section of the protective layer externally, each bracket including a base portion for connection to a supporting structure, a supporting face remote from the base portion for engaging the opposite surface section of said protective layer, a pressure plate, and adjusting and securing bolts passing through and engaging said pressure plate and engaging said bracket to locate said pressure plate in position spanning a protected section of said reflector engaged on said reflector supporting face, said pressure plate, bolts and pressure face cooperating to define clamping means engaging the former surface section of said protective layer and adjustable to deform the opposing former and latter surface sections of said protective layer for adjustment of the plane of the reflector therebetween.

3. In combination a reflector and mounting means therefor comprising a bracket including a base portion for connection to a supporting structure and a channel formation directed upwardly from said base portion, a pressure plate located in said channel adjacent one wall thereof, compressible packing means lining the inner face of said pressure plate, the opposite wall surface of said channel and the bed of said channel to define a recessed packing formation embracing an edge portion of said reflector, and adjustment means engaging said pressure plate through the adjacent wall of said channel; said adjustment means comprising bolts having threaded engagement through said adjacent wall with the ends of said bolts engaging said pressure plate at points near the edges thereof substantially midway along upper, lower and both side margins thereof whereby, with individual adjustment of said means, the pressure plate can be tilted to vary locally the compression in said packing material to adjust the plane of said reflector correspondingly.

4. A combination as set forth in claim 3 where the pressure plate is provided with end portions adapted and arranged to engage the laterally directed end portions of said adjacent wall for locating said pressure plate against substantial endwise movement with respect thereto.

5. In combination, a reflector and mounting means therefor comprising a bracket including a base portion for connection to a supporting structure and an upwardly extending structure defining a substantially upright supporting face and a lower supporting face projecting substantially perpendicularly forward therefrom, compressible material superimposed on said supporting faces for supporting engagement respectively with the back and the lower edge of said reflector, and upstanding lower lip formation at the forward end of the said lower supporting face in spaced relationship with respect to the lower edge of the face of said reflector, a pressure plate located adjacent the inner face of said lip formation, a layer of compressible material interposed between said pressure plate and said reflector, screw adjustment means engaging said pressure plate through said lower lip formation operable to urge said pressure plate inwardly for gripping the lower portion of the reflector and by deforming the compressible material, to vary the position of the lower portion of said reflector, an adjustable clamp member connected to an upper part of the bracket for engagement with an upper edge of the face of said reflector in spaced relation above said pressure plate, compressible material interposed between said clamp and said upper edge of the face of said reflector, and means for adjusting said clamp member to vary the gripping action of said clamp to deform the compressible material for adjustment of the position of the upper edge of the reflector with respect to the lower edge.

6. In combination, a reflector and mounting means therefor comprising a pair of brackets, one at each end of said reflector for mounting it on a supporting structure, each bracket including a base portion for connection to a supporting structure and an upwardly extending structure defining a substantially upright supporting face and a lower supporting face projecting substantially perpendicularly forward therefrom, compressible material superimposed on said supporting faces for supporting engagement respectively with the back and the lower edge of said reflector, an upstanding lower lip formation at the forward end of said lower supporting face of said reflector, a pressure plate located adjacent the inner face of said lower lip formation, a layer of compressible material interposed between said pressure plate and said reflector, screw adjustment means engaging said pressure plate through said lower lip formation operable to urge said pressure plate inwardly for gripping the lower portion of the reflector and, by deforming the compressible material, to vary the position of the lower portion of the reflector, an adjustable clamp member connected to an upper part of the bracket for engagement with an upper edge of the face of said reflector in spaced relation above said pressure plate, compressible material interposed between said clamp and said upper edge of the face of said reflector, and means for adjusting said clamp member to vary the gripping action of said clamps to deform the compressible material for adjusting the position of the upper edge of the reflector with respect to the lower edge.

7. A combination as set forth in claim 5, wherein the pressure plate is provided with end portions adapted and arranged to engage the laterally directed end portions of the lower lip formation for locating the pressure plate against substantially endwise movement with respect thereto.

8. In combination, a reflector and mounting means therefor comprising a bracket including a base portion for connection to a supporting structure, clamping means supported by said base portion and adapted to embrace at least an edge portion of said reflector, said clamping means incorporating a displaceable pressure plate on one side of said reflector, fixed means supporting the other side of said reflector and adjustment means operative between said bracket and said pressure plate, compressible packing means interposed between said clamping means and said reflector on each side of said reflector, said adjustment means comprising an element having screw-threaded engagement with said bracket and engaging said pressure plate, said pressure plate being in contact with said packing means and adapted to be moved by said adjustment means for locally distorting said packing means on both sides of said reflector to adjust the plane of said reflector relative to said fixed means.

9. In combination, a reflector and mounting means therefor comprising a bracket including a base portion for connection to a supporting structure and a channel formation directed upwardly from said base portion, a pressure plate located in said channel adjacent one wall thereof, compressible packing means lining the inner face of said pressure plate, the opposite wall surface of said channel, and the bed of said channel to define a recessed packing formation embracing an edge portion of said reflector, and adjustment means engaging said pressure plate through the adjacent wall of said channel, said adjustment means engaging said pressure plate and having threaded engagement through said adjacent wall whereby to vary locally the compression of both sides of said packing means to adjust the plane of said reflector relative to said fixed opposite channel wall surface.

HAROLD T. OLSON.

REFERENCES CITED

The following references are of record in the file of this patent:

UNITED STATES PATENTS

| Number | Name | Date |
|---|---|---|
| 1,417,326 | Jacobsson | May 23, 1922 |
| 2,200,168 | Goldberg | May 7, 1940 |
| 2,461,190 | Wolff | Feb. 8, 1949 |

FOREIGN PATENTS

| Number | Country | Date |
|---|---|---|
| 7,392 | Great Britain | Mar. 24, 1910 |